(12) United States Patent
Zhao et al.

(10) Patent No.: US 12,399,631 B2
(45) Date of Patent: Aug. 26, 2025

(54) SYSTEM AND METHOD FOR POWER MANAGEMENT IN SOLID STATE STORAGE SYSTEMS

(71) Applicant: Innogrit Technologies Co., Ltd., Shanghai (CN)

(72) Inventors: Gang Zhao, Chandler, AZ (US); Ming Lu, Sunnyvale, CA (US); Lin Chen, Cupertino, CA (US)

(73) Assignee: Innogrit Technologies Co., Ltd., Shanghai (CN)

( * ) Notice: Subject to any disclaimer, the term of this patent is extended or adjusted under 35 U.S.C. 154(b) by 0 days.

(21) Appl. No.: 18/638,815

(22) Filed: Apr. 18, 2024

(65) Prior Publication Data

US 2024/0264754 A1 Aug. 8, 2024

Related U.S. Application Data

(63) Continuation of application No. 17/730,572, filed on Apr. 27, 2022, now Pat. No. 11,989,426.

(51) Int. Cl.
*G06F 3/06* (2006.01)
*G06F 1/3234* (2019.01)

(52) U.S. Cl.
CPC .......... *G06F 3/0625* (2013.01); *G06F 1/3243* (2013.01); *G06F 3/0611* (2013.01); *G06F 3/0659* (2013.01); *G06F 3/0679* (2013.01); *G06F 2212/7206* (2013.01)

(58) Field of Classification Search
CPC .... G06F 3/0625; G06F 3/0611; G06F 3/0659; G06F 3/0679; G06F 2212/7206
See application file for complete search history.

(56) References Cited

U.S. PATENT DOCUMENTS

| | | | |
|---|---|---|---|
| 2006/0209444 A1* | 9/2006 | Song | G11B 20/10527 |
| 2007/0079063 A1* | 4/2007 | Mizuno | G06F 3/067 |
| | | | 711/170 |
| 2008/0168223 A1* | 7/2008 | Reeves | G06F 3/0674 |
| | | | 711/E12.001 |
| 2017/0068480 A1* | 3/2017 | Huang | G06F 1/3275 |
| 2017/0115916 A1* | 4/2017 | Jayachandran | G06F 3/0679 |
| 2022/0291843 A1* | 9/2022 | Kachare | G06F 3/0604 |

* cited by examiner

*Primary Examiner* — Kalpit Parikh
(74) *Attorney, Agent, or Firm* — IPro, PLLC

(57) ABSTRACT

Systems and apparatus are provided for power management of non-volatile storage (NVM) systems. A storage controller includes a command queue and a processor. The processor is configured to, in response to a data transfer rate from a host falling below a predetermined threshold and the command queue containing no command, enter a pseudo-idle power state by turning off input and output (IO) drivers of a memory interface coupling the storage controller and a non-volatile memory device and keeping on an internal memory of the storage controller.

10 Claims, 2 Drawing Sheets

SYSTEM AND METHOD FOR POWER MANAGEMENT IN SOLID STATE STORAGE SYSTEMS

TECHNICAL FIELD

The disclosure herein relates to management of non-volatile storage systems, particularly relates to power management for non-volatile storage systems.

BACKGROUND

Fast, reliable non-volatile memory (NVM) based storage systems, such as solid state drives (SSDs), have revolutionized data storage. More recently, NVM Express (NVMe) is an industry standard that provides a super-fast way to access non-volatile memory. However, there's a downside to NVMe technology: high power consumption. Therefore, non-volatile storage systems have to implement power management features that find acceptable balances between power, performance, product reliability and customer experience.

In general, a non-volatile storage system may be operational or idle, and thus, various operational and idle power levels have been defined. When a non-volatile storage system is non-operational but fails to transition to lower power modes, it will continue to draw power even though the non-volatile storage system is idle. On the other hand, while idle power states provide various power-saving levels, there's a tradeoff in the time it takes to enter and exit each idle power state. Long entry and exit latencies lead to lower performance or longer response time. Therefore, there is a need in power management for non-volatile storage drives that provides a balanced approach for power saving and entry/exit latencies.

SUMMARY

The present disclosure provides a storage system that implements a pseudo-idle power state. This pseudo-idle power state may be positioned as an intermediate power state between active and idle power states, with an entry latency and an exit latency at least one order faster than any idle power state. In the pseudo-idle power state, the power consumption may be about one order (5~20 times) lower than the lowest power consumption of any active state and one order higher than the highest power consumption of any idle state.

In various embodiments, methods and systems may be implemented to manage the entry into and exit from the pseudo-idle power state. A threshold data transfer rate for the data bus connected to a host may be pre-determined as one condition to enter the pseudo-idle power state. A non-empty command queue for command received from the host may be used as another condition to enter the pseudo-idle power state. The storage system may enter this pseudo-idle power state when the command queue is empty, and the bus transfer rate is below a predetermined threshold but above zero. The command queue may also be used as the condition to exit the pseudo-idle power state and enter an active power state. When there is a command from the host, an exemplary non-volatile storage system may exit the pseudo-idle power state and enter a full performance power state.

In one exemplary embodiment, there is provided a non-volatile storage system that may comprise: a first interface to be coupled to a host, a non-volatile memory device, a storage controller comprising a command queue and a processor, and a second interface coupling the storage controller and the non-volatile memory device. The processor may be configured to: handle data transfer requests from the host in an active power state, monitor the command queue and a data transfer rate on a data bus of the first interface, determine that the data transfer rate falls below a predetermined threshold and there is no command in the command queue, enter a pseudo-idle power state in which input and output (IO) drivers of the second interface is turned off but a power domain for an on-chip internal memory of the storage controller is kept on, determine that there is a new command in the command queue from the host, and exit the pseudo-idle power state and enter the active power state.

In another exemplary embodiment, there is provided a method for managing power of a non-volatile storage system. The method may comprise handling data transfer requests from a host in an active power state, monitoring a command queue in a storage controller of the non-volatile storage system and a data transfer rate on a data bus of a first interface between the host and the non-volatile storage system, determining that the data transfer rate falls below a predetermined threshold and there is no command in the command queue, entering a pseudo-idle power state in which input and output (IO) drivers of a second interface coupling the storage controller and a non-volatile storage device of the non-volatile storage system is turned off but a power domain for an on-chip internal memory of the storage controller is kept on, determining that there is a new command in the command queue from the host, and exiting the pseudo-idle power state and entering the active power state.

In yet another exemplary embodiment, there is provided a non-transitory machine-readable medium having computer instructions embedded thereon. The computer instructions, when executed by a hardware processor, may cause the hardware processor to perform: handling data transfer requests from a host at a non-volatile storage system in an active power state, monitoring a command queue in a storage controller of the non-volatile storage system and a data transfer rate on a data bus of a first interface between the host and the non-volatile storage system, determining that the data transfer rate falls below a predetermined threshold and there is no command in the command queue, entering a pseudo-idle power state in which input and output (IO) drivers of a second interface coupling the storage controller and a non-volatile storage device of the non-volatile storage system is turned off but a power domain for an on-chip internal memory of the storage controller is kept on, determining that there is a new command in the command queue from the host, and exiting the pseudo-idle power state and entering the active power state.

DETAILED DESCRIPTION

Figure 1:
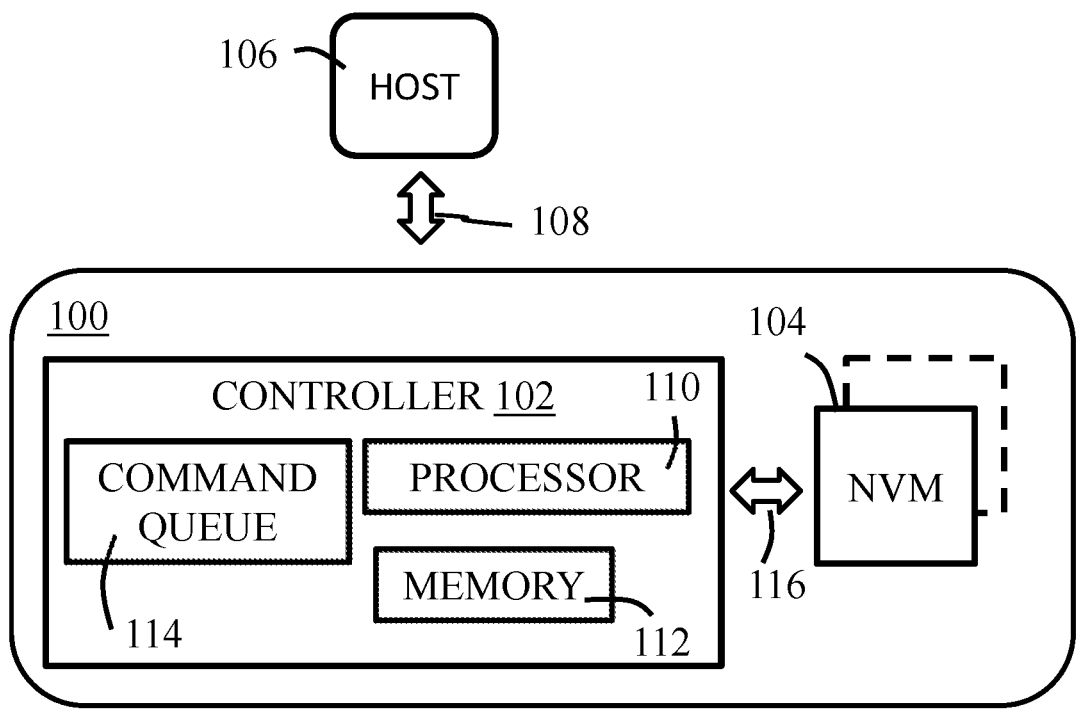
FIG. 1 schematically shows a non-volatile storage system with power management in accordance with an embodiment of the present disclosure.

Specific embodiments according to the present disclosure will now be described in detail with reference to the accompanying figures. Like elements in the various figures are denoted by like reference numerals for consistency.

FIG. 1 schematically shows a non-volatile storage system 100 with power management including a pseudo-idle state in accordance with an embodiment of the present disclosure. The non-volatile storage system 100 may comprise a storage controller 102 and one or more non-volatile memory (NVM) devices 104. The storage controller 102 may be coupled to the one or more NVM devices 104 by a NVM device interface 116. The NVM device interface 116 may include input and output drivers (IO) and on-die termination (ODT) circuits. In embodiments the NVM devices are NAND devices, the NVM device interface 116 may be a NAND interface.

The non-volatile storage system 100 may be coupled to a host 106 via an interface 108. The interface 108 may include a data bus for data transfer between the non-volatile storage system 100 and the host 106. The interface 108 may be one of many currently used or yet to be developed interfaces, such as, but not limited to, Serial AT Attachment (SATA), Parallel ATA (PATA), PCI Express (PCIe), Secure Digital (SD), Universal Serial Bus (USB), etc. The non-volatile storage system 100 may be implemented in memory cards, USB flash drives and solid-state drives in various embodiments to provide non-volatile storage for the host 106. In some embodiments, the host 106 may be a computing device, such as, but not limited to, a smart phone, a pad computing device, a desktop computer, a laptop computer, a server computer, etc.

The NVM devices 104 may provide non-volatile data storage for the non-volatile storage system 100. In some embodiments, the NVM devices 104 may be one or more NAND flash devices. In some other embodiments, the NVM devices 104 may be one or more other types of non-volatile storage devices, for example, NOR flash memories, magnetoresistive random Access Memory (MRAM), resistive random access memory (RRAM), phase change random access memory (PCRAM), Nano-RAM, etc.

The storage controller 102 may comprise a computer processor 110, a memory 112 and a command queue 114. The computer processor 110 may be, for example, a microprocessor or a microcontroller. The memory 112 may be an on-chip Static Random Access Memory (SRAM) and may store executable instructions and data of a firmware that manage the non-volatile storage system 100. In at least one embodiment, the computer processor 110 may be configured to execute executable instructions of the firmware in the memory 112 to perform various operations for managing the non-volatile storage system 100. The command queue 114 may be a storage for commands from the host 104. In the embodiments that the interface 108 is the PCI Express (PCIe), all commands from the host may be referred to as Non-Volatile Memory Express (NVMe) commands. The NVMe commands may include various sets of commands, for example, admin commands and I/O commands. The admin commands may include administrative and management commands, including identify and get-log-page, etc. The I/O commands may handle data access such as read and write.

The storage controller 102 may be configured to perform power management for the non-volatile storage system 100. In some embodiments, the non-volatile storage system 100 may have one or more active power states. In each of the one or more active power states, the non-volatile storage system 100 may be fully operational and actively handling data requests from the host 104. For example, data requests may be received from the host 104 as data access commands. The storage controller 102 may pick up the commands from the command queue 114 and service the data requests (e.g., read data from or write data to the NVM devices 104).

In some embodiments, the one or more active power states may include Power State Zero (PS0), Power State One (PS1) and Power State 2 (PS2). PS0 may be an active state with full speed and performance and the highest power consumption. When the non-volatile storage system 100 is in PS0 power state, various components of the non-volatile storage system 100 may be operational, for example, the memory 112, NVM device IO and ODT circuits of the NVM device interface 116, various power domains of the controller 102 may be turned on. Moreover, there is no clock gating for the controller clock and the clock speed of the controller 102 may be high. In contrast, PS1 and PS2 may have some levels of throttling to limit power consumption as well as performance. For example, the clock speed of the controller 102 may be slower in PS1 than in PS0, and slower in PS2 than in PS1.

The non-volatile storage system 100 may also have one or more idle power states. For example, the one or more idle power states may include Power State 3 (PS3), and Power State 4 (PS4). PS3 may be referred to as a sleep state, in which the non-volatile storage system 100 may enter a sleep mode. For example, the memory 112 may be put in a sleep (with power turned off but periodically turned on to refresh), the NVM device IO and ODT may be turned off, various power domains of the controller 102 may be partially on and partially off.

Moreover, clock gating may be enabled for the controller clock and the clock speed of the controller 102 may be extremely low. PS4 may be referred to as a deep sleep state, in which in addition to those turned off in the PS3 state, more components of the non-volatile storage system 100 may be turned off. For example, various power domains of the controller 102 may be turned off.

In addition to the one or more active power states and one or more idle power states, the non-volatile storage system 100 may have at least one power state which may consume more power than any idle power state and less power than any active power state. The power state with power consumption between the active power states and the idle power states is neither an active power state, nor an idle power state, and may be referred to as a pseudo-idle power state. In the pseudo-idle power state, more components of the non-volatile storage system 100 may be turned on compared to the idle power states, and less components of the non-volatile storage system 100 may be turned on compared to the active power states. For example, in the pseudo-idle power state, the memory 112 may be on, the NVM device IO and ODT may be turned off, various power domains of the controller 102 may be on. Moreover, in the pseudo-idle power state, clock gating may be enabled for the controller clock and the clock speed of the controller 102 may be low.

Table 1 may illustrate some exemplary features of the pseudo-idle power state, PS0 and PS3 and show that the pseudo-idle power state may be distinctive from the existing idle states. First, the internal memory 112 (SRAM) of the controller 102 may stay on during the pseudo-idle power state. In contrast, the internal SRAM in the PS3 power state may be put into a deep sleep mode. Second, the NVM device IO drivers and on-die termination (ODT) may be switched to off for power savings in the pseudo-idle power state and may remain off in the idle power states.

Third, the power domains inside the controller 102 may remain on in the pseudo-idle power state, while in PS3 some of the power domains may be turned off. For example, the power domain of memory controller is turned off in PS3, but may be kept on in the pseudo-idle power state.

Forth, the controller clock gating may be enabled in the pseud-idle power state for further power savings, while in the active states they may be disabled. Therefore, the pseudo-idle power state may have a shorter exit latency (e.g., shorter time to exit) than the idle state PS3. Because PS3 may have a shorter exit latency than PS4, the pseudo-idle power state may have a much shorter exit latency than the idle state PS4. That is, the non-volatile storage system 100 may exit from the pseudo-idle power state and enter PS0 (or any other active power states) faster than PS3 and PS4.

TABLE 1

Implementation Details of the Pseudo-Idle Power State in one embodiment

| Power States | PS3 | Pseudo-Idle Power State | PS0 |
|---|---|---|---|
| SRAM | Deep Sleep | On | On |
| NVM device IO | Off | Off | On |
| Controller Power Domains | Partially Off | On | On |
| Controller Clock Gating | Enabled | Enabled | Off |
| Clock | Extremely Low | Low | High |

Also as illustrated in Table 1, the internal clock speed for the pseudo-idle power state may be lower than the internal clock speed for active states and higher than the internal clock speed for PS3. In one exemplary embodiment, the internal CPU clock for the controller 102 may be 166 MHz for the pseudo-idle power state, compared to 400~800 MHZ in the active states and only several MHz in the PS3 idle state.

Data transfer via the data bus of the interface 108 may be monitored to determine whether the non-volatile storage system 100 should enter the pseudo-idle power state from an active power state. For example, the non-volatile storage system 100 may switch from an active power state when the data transfer rate on the interface 108 falls below a predetermined threshold value but still higher than zero and there is no command in the command queue 114. In one embodiment, the data bus of the interface 108 may be monitored by the processor 110 (e.g., executing firmware). The processor 110 may calculate an average bus transfer rate by calculating the size of data transferred within a given time interval (e.g., one second). In some embodiments, the average bus transfer rate may be used to monitor the data bus and the predetermined threshold value may be 500 mega-bytes per second (MB/s). The data transfer may be monitored by checking the bus transfer rate at a frequency of once every millisecond (e.g., 1 KHz). If a new command is received from the host 106 and entered in the command queue 114, regardless of whether it is an administrative command or an I/O command, the non-volatile storage system 100 may exit the pseudo-idle power state and enter an active state.

Figure 2:
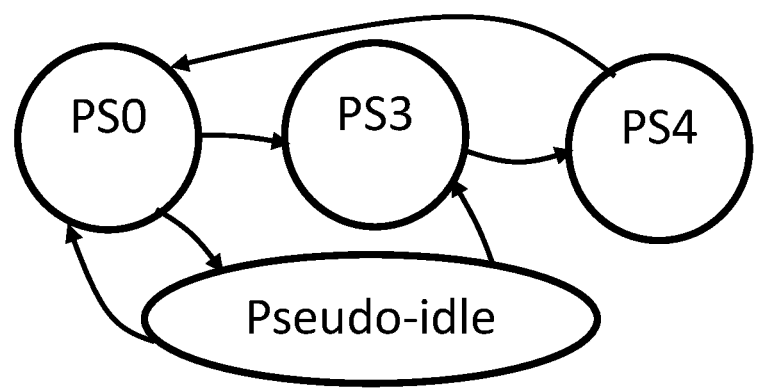
FIG. 2 is block diagram of power states of a non-volatile storage system in accordance with an embodiment of the present disclosure.

FIG. 2 is block diagram of power states of a non-volatile storage system in accordance with an embodiment of the present disclosure. Power State zero (PS0) may be an active power state with full speed and full performance. The non-volatile storage system 100 may switch from PS0 to PS3 when the idle time of the interface 108 has reached a first threshold. The interface 108 may be idle when its data transfer rate is zero. In some embodiments, the first threshold may be in the order of seconds, for example, in a range of 1 to 3 seconds (1~3 seconds).

The non-volatile storage system 100 may switch from PS3 to PS4 when the idle time of the interface 108 has reached a second threshold. In some embodiments, the second threshold may be in the order of tens of seconds, for example, in a range to 10 to 30 seconds (10~30 seconds).

In various embodiments, the non-volatile storage system 100 may switch from PS0 to the pseudo-idle power state when the data transfer rate of the interface 108 falls below a pre-determined threshold (e.g., 500 MB/s) and there is no command in the command queue 114. If there is a new command from the host 106, the non-volatile storage system 100 may exit the pseudo-idle power state and return to the active PS0 power state.

The non-volatile storage system 100 may exit PS3 power state and PS4 power state and return to the active PS0 power state when data transfer has resumed on data bus of the interface 108 (e.g., after a new data access command has been received and processed). The non-volatile storage system 100 may also switch from the pseudo-idle state to the PS3 power state when the data transfer rate on the data bus of the interface 108 has reached zero and stayed idle for a threshold value (e.g., 1~3 seconds).

The non-volatile storage system 100 may have other active power states, and the power state PS0 may be a representative power state for these active power states. The conditions for transitions (e.g., to and from) between any of the other active power states and pseudo-idle power state may be the same as PS0 and pseudo-idle power state.

Figure 3:
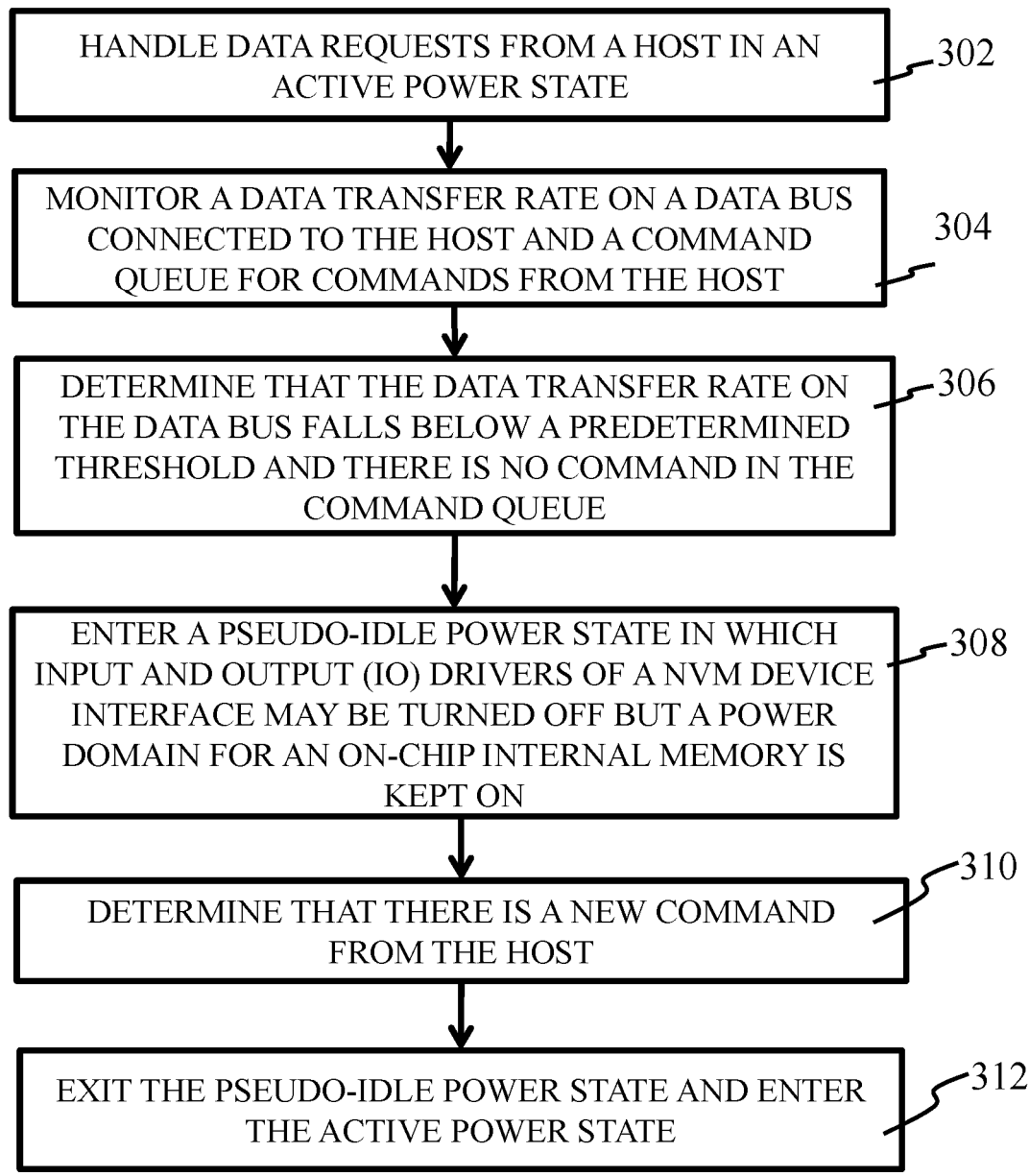
FIG. 3 is a flowchart of a process for conducting power management of a non-volatile storage system in accordance with an embodiment of the present disclosure.

FIG. 3 is a flowchart of a process 300 for conducting power management of a non-volatile storage system in accordance with an embodiment of the present disclosure. At block 302, data requests from a host may be handled by a non-volatile storage system in an active power state. For example, the non-volatile storage system 100 may handle data requests from the host 106 in an active power state. The data requests may be I/O commands received from the host to write data to or read data from the non-volatile storage system 100.

At block 304, a data transfer rate on a data bus connected to the host and a command queue for commands from the host may be monitored. For example, the interface 108 may have a data bus coupled to the host and the data transfer rate on the data bus of the interface 108 may be checked periodically (e.g., by calculating the size of data transferred every second). Also, the command queue 114 may be monitored by the controller 102. The data transfer may be monitored by checking the bus transfer rate at a frequency of once every millisecond (e.g., 1 KHz). At block 306, it may be determined that the data transfer rate falls below a predetermined threshold value and there is no command in the command queue. For example, the controller 102 may determine that there is no command in the command queue, and the data transfer rate has fallen below a pre-determined threshold (e.g., 500 MB/s).

At block 308, the non-volatile storage system may enter a pseudo-idle power state in which input and output (IO) drivers of a NVM device interface may be turned off but a power domain for an on-chip internal memory of the storage controller may be kept on. In various embodiments, the non-volatile storage system 100 may use the data transfer rate on the data bus of the interface connected to the host and whether there is a command in the command queue 114 as criteria to determine whether to enter the pseudo-idle power state. As soon as the data transfer rate falls below a predetermined threshold value and there is no command in the command queue 114, the non-volatile storage system 100 may enter the pseudo-idle power state, in which the nonvolatile storage system 100 may turn off certain functions to become not fully operational but not idle either, for example, I/O drivers for NVM device interface turned off but the power domain for the SRAM of the storage controller may be kept on.

At block 310, it may be determined that there is a new command from the host. At block 312, the non-volatile storage system may exit the pseudo-idle power state to enter the active power state. For example, the non-volatile storage system 100 may monitor the command queue 114 and as soon as a new command is received from the host 106 and entered into the command queue, the non-volatile storage system 100 may leave the pseudo-idle power state and enter the active power state.

The process 300 and features of the non-volatile storage system 100 related to power management (e.g., transition between different power states) may be implemented using software (e.g., executable by a computer processor (CPU, GPU, or both)), hardware (e.g., a field-programmable gate array (FPGA) or an application-specific IC (ASIC), firmware, or any suitable combination of the three. In one embodiment, for example, the process 300 and features of the non-volatile storage system 100 related to power management may be programmed in computer processor executable instructions, stored in a non-transitory machine-readable medium (e.g., the non-volatile storage device 104, hard drive, CD, DVD, etc.) and performed by the processor 110 (e.g., a microprocessor or a microcontroller) executing the executable instructions.

In one exemplary embodiment, there is provided a non-volatile storage system that may comprise: a first interface to be coupled to a host, a non-volatile memory device, a storage controller comprising a command queue and a processor, and a second interface coupling the storage controller and the non-volatile memory device. The processor may be configured to: handle data transfer requests from the host in an active power state, monitor the command queue and a data transfer rate on a data bus of the first interface, determine that the data transfer rate falls below a predetermined threshold and there is no command in the command queue, enter a pseudo-idle power state in which input and output (IO) drivers of the second interface is turned off but a power domain for an on-chip internal memory of the storage controller is kept on, determine that there is a new command in the command queue from the host, and exit the pseudo-idle power state and enter the active power state.

In one embodiment, the predetermined threshold of the data transfer rate may be 500 mega-bytes per second (MB/s).

In one embodiment, the data transfer rate may be an average bus transfer rate calculated as a size of data transferred within a second.

In one embodiment, the data transfer rate may be checked at a frequency of once every millisecond.

In one embodiment, the processor may be further configured to exit the pseudo-idle power state and enter a sleep state when the data transfer rate has been zero for a first threshold of time and there is no new command in the command queue from the host. The first threshold of time may be in a range of 1 to 3 seconds.

In one embodiment, in the pseudo idle power state, the processor may be further configured to turn off on-die termination (ODT) circuits of the second interface.

In one embodiment, in the pseudo idle power state, the processor may be further configured to turn on clock gating and maintain a clock speed for the storage controller that is lower than in the active power state but higher than in any idle power states.

In another exemplary embodiment, there is provided a method for managing power of a non-volatile storage system. The method may comprise handling data transfer requests from a host in an active power state, monitoring a command queue in a storage controller of the non-volatile storage system and a data transfer rate on a data bus of a first interface between the host and the non-volatile storage system, determining that the data transfer rate falls below a predetermined threshold and there is no command in the command queue, entering a pseudo-idle power state in which input and output (IO) drivers of a second interface coupling the storage controller and a non-volatile storage device of the non-volatile storage system is turned off but a power domain for an on-chip internal memory of the storage controller is kept on, determining that there is a new command in the command queue from the host, and exiting the pseudo-idle power state and entering the active power state.

In one embodiment, the predetermined threshold of the data transfer rate may be 500 mega-bytes per second (MB/s).

In one embodiment, the data transfer rate may be an average bus transfer rate calculated as a size of data transferred within a second.

In one embodiment, the data transfer rate may be checked at a frequency of once every millisecond.

In one embodiment, the on-chip internal memory of the storage controller may be a Static Random Access Memory (SRAM).

In one embodiment, the method may further comprise: turning off on-die termination (ODT) circuits of the second interface in the pseudo idle power state.

In one embodiment, the method may further comprise, in the pseudo idle power state, turning on clock gating and maintaining a clock speed for the storage controller that is lower than in the active power state but higher than in any idle power states.

In yet another exemplary embodiment, there is provided a non-transitory machine-readable medium having computer instructions embedded thereon. The computer instructions, when executed by a hardware processor, may cause the hardware processor to perform: handling data transfer requests from a host at a non-volatile storage system in an active power state, monitoring a command queue in a storage controller of the non-volatile storage system and a data transfer rate on a data bus of a first interface between the host and the non-volatile storage system, determining that the data transfer rate falls below a predetermined threshold and there is no command in the command queue, entering a pseudo-idle power state in which input and output (IO) drivers of a second interface coupling the storage controller and a non-volatile storage device of the non-volatile storage system is turned off but a power domain for an on-chip internal memory of the storage controller is kept on, determining that there is a new command in the command queue from the host, and exiting the pseudo-idle power state and entering the active power state.

In one embodiment, the predetermined threshold of the data transfer rate may be 500 mega-bytes per second (MB/s).

In one embodiment, the data transfer rate may be an average bus transfer rate calculated as a size of data transferred within a second, and checked at a frequency of once every millisecond.

In one embodiment, the computer instructions, when executed by the hardware processor, may further cause the hardware processor to perform: exiting the pseudo-idle power state and entering a sleep state when the data transfer rate has been zero for a first threshold of time and there is no new command in the command queue from the host. The first threshold of time may be in a range of 1 to 3 seconds.

In one embodiment, the computer instructions, when executed by the hardware processor, may further cause the hardware processor to perform: turning off on-die termination (ODT) circuits of the second interface in the pseudo idle power state.

In one embodiment, the computer instructions, when executed by the hardware processor, may further cause the hardware processor to perform, in the pseudo idle power state, turning on clock gating and maintaining a clock speed for the storage controller that is lower than in the active power state but higher than in any idle power states.

Any of the disclosed methods and operations may be implemented as computer-executable instructions (e.g., software code for the operations described herein) stored on one or more computer-readable storage media (e.g., non-transitory computer-readable media, such as one or more optical media discs, volatile memory components (such as DRAM or SRAM), or nonvolatile memory components (such as hard drives)) and executed on a device controller (e.g., firmware executed by ASIC). Any of the computer-executable instructions for implementing the disclosed techniques as well as any data created and used during implementation of the disclosed embodiments can be stored on one or more computer-readable media (e.g., non-transitory computer-readable media).

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A storage controller comprising a command queue and a processor;
   wherein the processor is configured to, determine a data transfer rate from a host and whether the command queue containing any command,
   wherein the processor is configured to, in response to the data transfer rate falling below a predetermined non-zero threshold and the command queue containing no command, enter a pseudo-idle power state by turning off input and output (IO) drivers of a memory interface coupling the storage controller and a non-volatile memory device and keeping on an internal memory of the storage controller;
   wherein the processor is configured to, in response to the data transfer rate reaching zero and staying zero for a first temporal threshold, enter a sleep state from the pseudo-idle power state, by putting the internal memory to sleep, turning off a first power domain of the storage controller, and maintaining a clock speed for the storage controller that is lower than in the pseudo-idle power state.

2. The storage controller of claim 1, wherein the processor is configured to:
   handle data transfer requests from the host in an active power state; or
   monitor the command queue and the data transfer rate; or
   determine whether the data transfer rate falls below the predetermined non-zero threshold and whether the command queue contains no command.

3. The storage controller of claim 1, wherein the processor is configured to, in response to the command queue containing a new command from the host, exit the pseudo-idle power state and enter an active power state.

4. The storage controller of claim 3, wherein the processor is configured to determine whether the command queue contains the new command.

5. The storage controller of claim 1, wherein the data transfer rate is an average bus transfer rate calculated as a size of data transferred within a second.

6. The storage controller of claim 1, wherein the processor is configured to exit the pseudo-idle power state and enter a sleep state in response to the data transfer rate being zero for a first duration and the command queue containing no command.

7. The storage controller of claim 1, wherein in the pseudo-idle power state, the processor is configured to turn off on-die termination (ODT) circuits of the memory interface.

8. The storage controller of claim 1, wherein in the pseudo-idle power state, the processor is configured to turn on clock gating and maintain a clock speed for the storage controller that is lower than in an active power state.

9. The storage controller of claim 1, wherein the processor is configured to, in response to the data transfer rate staying zero for a second temporal threshold longer than the first temporal threshold, enter a deep sleep state from the sleep state, by turning off a second power domain of the storage controller.

10. A non-volatile storage system, comprising:
    the storage controller of claim 1;
    a host interface coupling the storage controller to the host;
    the non-volatile memory device; and
    the memory interface.

* * * * *